United States Patent [19]
Hultgren, III

[11] Patent Number: 5,809,164
[45] Date of Patent: Sep. 15, 1998

[54] SYSTEM AND METHOD FOR COLOR GAMUT AND TONE COMPRESSION USING AN IDEAL MAPPING FUNCTION

[75] Inventor: Bror O. Hultgren, III, Ipswich, Mass.

[73] Assignee: Polaroid Corporation, Cambridge, Mass.

[21] Appl. No.: 612,123

[22] Filed: Mar. 7, 1996

[51] Int. Cl.$^6$ ........................................................ G06K 9/00
[52] U.S. Cl. ............................................ 382/162; 382/166
[58] Field of Search .................................... 382/162, 166, 382/167, 274; 358/518, 520, 522; 395/131; 364/526; 345/431

[56] References Cited

U.S. PATENT DOCUMENTS

| | | | |
|---|---|---|---|
| 5,239,370 | 8/1993 | Yamaguchi | 358/518 |
| 5,410,617 | 4/1995 | Kidd et al. | 358/466 |
| 5,420,704 | 5/1995 | Winkelman | 358/518 |
| 5,521,723 | 5/1996 | Madden et al. | 358/501 |

FOREIGN PATENT DOCUMENTS

| | | |
|---|---|---|
| 2252469 | 8/1992 | United Kingdom . |
| 92065557 | 4/1992 | WIPO . |

*Primary Examiner*—Phuoc Tran
*Attorney, Agent, or Firm*—Donald F. Mofford; Barry Gaiman

[57] ABSTRACT

A color management system including methods relying on an "Ideal Film Model" color mapping function characterized by exact colorimetric detection of world color information, a nonlinear tone compression acting on the tristimulus values X/Xn, Y/Yn, Z/Zn, and an exact calorimetric display of the compressed tristimulus values. The system and method operate to provide a process for describing the necessary tone reproduction required in displaying optimal reproductions of complex world pictorial scenes over a plurality of elements in an image processing system and to provide a reference system for evaluating the color and tone reproduction of real imaging systems; provide a well defined calibration protocol for the calibration of electronic and hybrid imaging systems designed to capture complex world scenes; and provide a useful model for simulating some sensitometric attributes of real photographic systems.

14 Claims, 11 Drawing Sheets

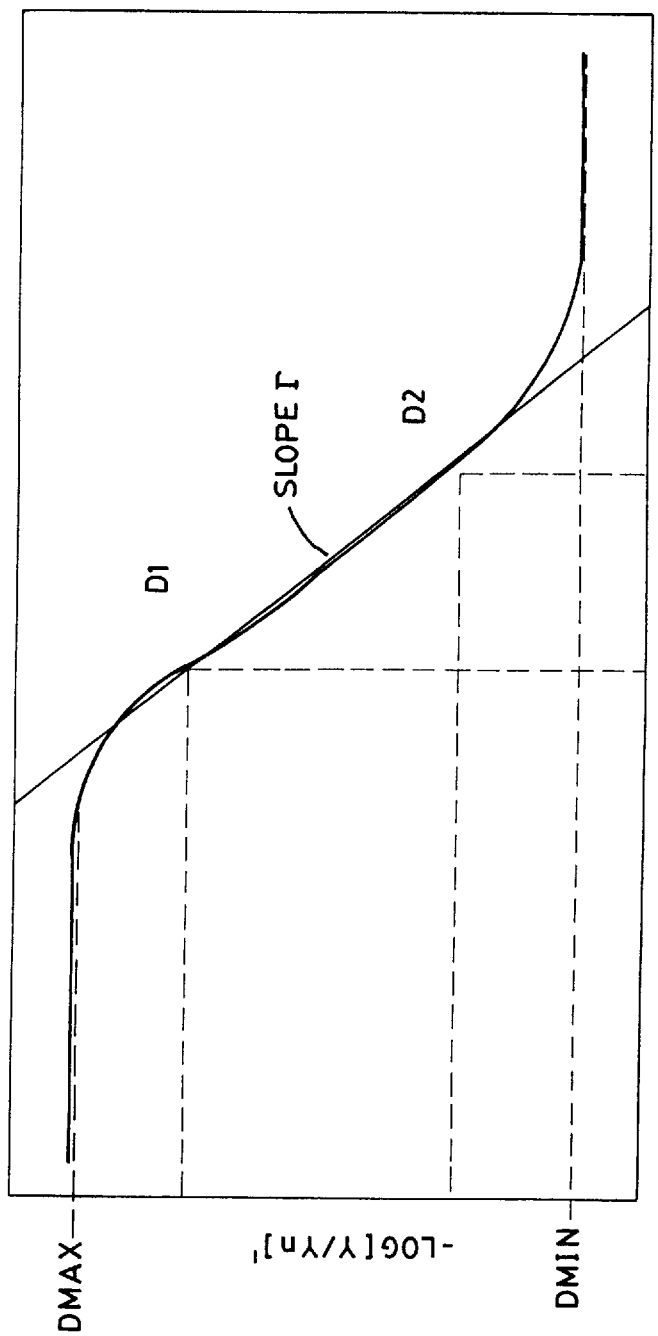

SYSTEM AND METHOD FOR COLOR GAMUT AND TONE COMPRESSION USING AN IDEAL MAPPING FUNCTION

FIELD OF THE INVENTION

This invention in general relates to color management in electronic imaging systems and, more particularly, to color mapping systems and methodologies by which color gamut and tone compression may be achieved.

BACKGROUND OF THE INVENTION

A major goal in electronic imaging systems is to have the colors and tones of a digital image appear substantially uniform across all of its elements, even though each element usually differs in its ability to reproduce the tonal and color gamut content of the original subject.

As is well-known, electronic imaging permits the arbitrary mapping of the value of any pixel to any color, constrained only by the metamerism of the detector and the gamut of the printer/media/display. At first blush one might think that this freedom can be exploited to exactly reproduce the color of the original object in the final image. However, even in scenes in which lighting is well controlled (TV studio), this may not be possible because the scene may contain colors that lie outside the color gamut of the reproduction media or display device, such as a color monitor. Typically, photographic scenes or natural subjects may be characterized by a complex illumination of reflective surfaces. For example a green leaf, with a given spectral reflectivity, may be illuminated in full sun, diffuse reflected sunlight, or full shade. The problem of how to give a colorimetric description of the leaf under these complex lighting situations is not well defined. This is but one example of dynamic range mismatches between the original scene and the reproduction media. Optimal image reproduction requires the development of an algorithm to impose tone compression between the external world scene and the reproduction media. Or put another way, an optimal color imaging system must match the visual appearance in an original image and that of the reproduced image in every stage of the image processing chain whether it be scanning, display, or hardcopy output.

To achieve this goal, those skilled in the art have used such schemes as histogram normalization and histogram equalization as well as others.

The underlying philosophy of the present invention resides in the insight that a successful system and algorithm for gamut/tone compression can be based upon the wisdom accumulated from 150 years of photographic technology. A fundamental characteristic of photographic imaging systems is the H&D curve describing tone reproduction. The shape of this curve has been determined through subjective testing in the marketplace to yield a pleasing reproduction of relative brightness in a wide range of pictorial images. Basing a tone compression algorithm on the shape of these types of curves yields the most pleasing image reproduction.

Even though all photographic systems introduce forms of color reproduction error—e.g., interimage effects, an electronic imaging system is not bound by these constraints, and it is a primary object of the present invention to provide a color gamut and tone compression methodology that demands calorimetric reproduction subject to a "film like" tone reproduction.

Another object of the present invention is to provide a color mapping function the mimics the characteristics of an "ideal film model", recognizing that it can be most closely realized as an electronic imaging system.

Other objects of the invention will in part readily apparent and in part be obvious when the following detailed description is read in connection with the accompanying drawings.

SUMMARY OF THE INVENTION

An electronic imaging system and color management methodology covering a wide variety of complex scenes is facilitated through the construct of an "Ideal Film Model". This construct is a "film like" model in the sense that it mirrors the functionality of a film/camera system: capturing an image of the world and transforming it to a display medium. The Ideal Film Model described in this invention is characterized by a "film like" Tone Compression algorithm while maintaining exact colorimetric reproduction in image capture and display. The need for a tone compression algorithm is shown by considering the dynamic range incompatibility of typical complex photographic scenes with reproduction media and/or displays. The form of the tone compression algorithm for reflection images is taken from the tone reproduction curve (H&D curve) of conventional photographic (color) reflection prints. The spectral sensitivity of the Ideal Film Model maintains exact colorimetric reproduction—i.e., the spectral sensitivities are assumed to be a linear combination of the color matching functions. Tone compression is imposed subject to the constraint that calorimetric neutrality is preserved. A consequence of this tone compression is a natural method of gamut compression to the display media, desaturating colors in the highlights and shadows. The resulting tone compressed image is then considered to be the final prescription for display—i.e., no information is lost or distorted in the display process.

Among the applications of the Ideal Film Model discussed in this invention is the model's utility in establishing reproduction goals for real and simulated imaging systems.

DESCRIPTION OF THE DRAWINGS

This invention is pointed out with particularity in the appended claims. The above and further advantages of this invention may be better understood by referring to the following description taken in conjunction with the accompanying drawings, in which:

FIG. 8 is a graph showing an analytic closed form of an Ideal Film color mapping function of the invention.

DESCRIPTION OF THE INVENTION

Figure 1:
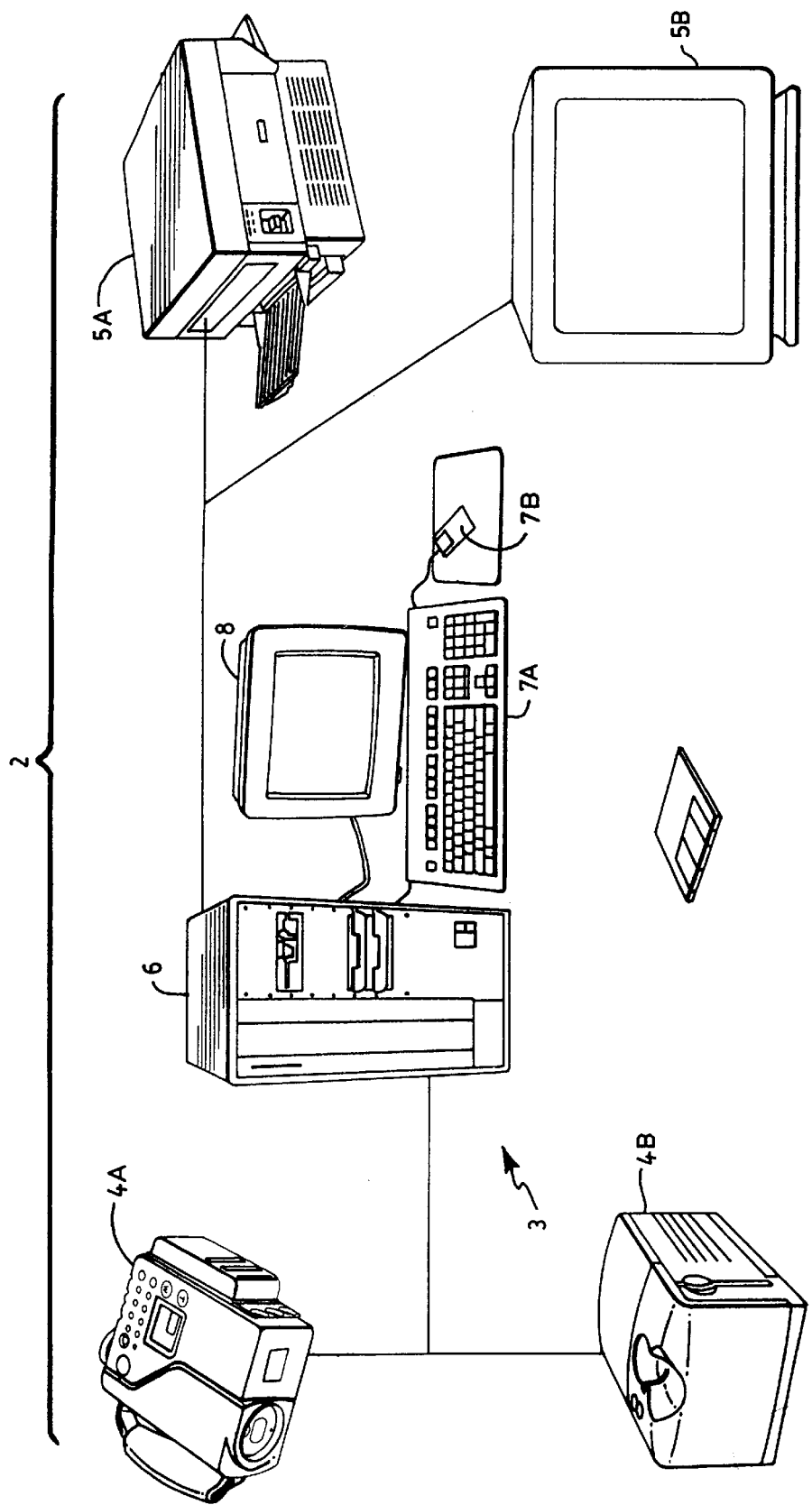
FIG. 1 is a diagram of an image acquisition and rendering system including an image processing system constructed in accordance with the invention.

FIG. 1 is a diagram of an image acquisition and rendering system 2 that includes one embodiment of an image processing system 10 (shown below in FIG. 2) that is constructed in accordance with the invention. With reference to FIG. 1, the image acquisition and rendering system 2 in one embodiment includes a computer 3, one or more image acquisition devices represented by a camera 4A and a document or page scanner 4B (generally identified by reference numeral 4), for acquiring an image and converting it to digital image data, and one or more image rendering devices represented by a printer 5A and a video output 5B (generally identified by reference numeral 5) for generating an output image. The computer 3, which in one embodiment is a general-purpose stored-program digital computer which comprises the image processing system 10, receives the digital image data and processes it as described below in connection with FIG. 2 and the remaining figures for, for example, display or rendering by an image rendering device.

As is conventional, the computer 3 includes a processor module 6 and operator interface elements comprising operator input components such as a keyboard 7A and/or a mouse 7B (generally identified by reference numeral 7) and operator output elements such as a video display device 8. The processor module 6 includes, for example, processor, memory and mass storage devices such as disk and/or tape storage elements (not separately shown) which perform processing and storage operations in connection with digital data provided thereto. When operating as the image processing system 10, the computer 3 will generally be processing certain programs which enable it to perform selected image processing operations as described below in connection with FIGS. 2 through 9 to process digital image data. The operator input elements 7 are provided to permit an operator to input information for processing, including information for controlling the image processing operations. The video display device 8 is provided to display output information to the operator, such as information identifying certain selections the operator may make in connection with the processing of the image data. Although the computer 3 is shown as comprising particular components, such as the keyboard and mouse for receiving input information from an operator, and a video display device for displaying output information to the operator, it will be appreciated that the computer system 3 may include a variety of components in addition to or instead of those depicted in FIG. 1.

In addition to comprising the image processing system 10, the computer 3 may also comprise a conventional computer graphics system for generating and editing an image in the form of digital image data. Digital image data generated by the computer graphics system may be processed in connection with the image processing system 10. In addition, processed digital image data that is generated by the image processing system 10 may be provided to the computer graphics system for editing. In connection with the computer graphics system, the computer 3 may process certain computer graphics programs that enable the operator to use the operator input components 7 to control generation of an image. Typically, the computer 3 will use the video display device 8 to display the image to the operator as it is being generated.

Although one embodiment of the image processing system 10 has been indicated as comprising elements of a general-purpose stored-program computer 3, it will be apparent to those skilled in the art that the image processing system 10 may alternatively include special-purpose hardware and/or program components, or a combination of a computer 3 with special-purpose hardware and/or program components.

Figure 2:
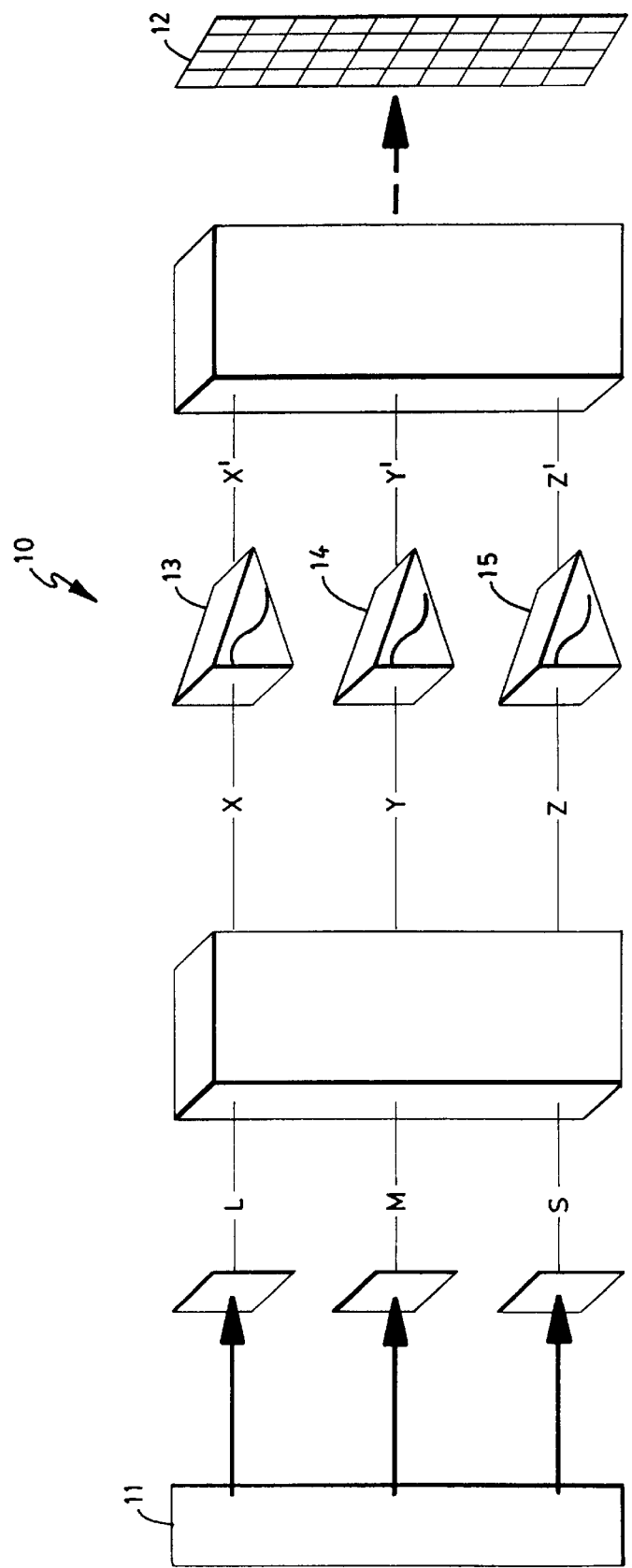
FIG. 2 is a functional block diagram of the image processing system forming part of the image acquisition and rendering system depicted in FIG. 1.

FIG. 2 is a functional block diagram of the image processing system 10. With reference to FIG. 2, the image processing system 10 obtains image data defining an image from an image data source 11, processes it as described below, and provides the processed image data to a downstream utilization element 12. The image data source 11 may provide image data from an image acquisition device 4, or from an image data generation arrangement, such as the computer graphics system described above. In either case, the digital image data will generally be provided to image processing system 10 through a buffer or other image data source selection arrangement. In one particular embodiment, in which the image processing system 10 processes image data in digital form, the image acquisition arrangement or other image data source will provide the image data in digital form, in which the image is represented by a multi-dimensional array of picture elements, or "pixels," each of which is associated with a corresponding point of the image. Each pixel is represented by digital data that defines, for example, the color and intensity of the pixel's corresponding point in the image. As is conventional, the digital data associated with each pixel may be in "RGB" or similar device dependent format, in which the data associated with each pixel identifies the intensity of the colors red, green and blue of the pixel. Other conventional formats for representing digital image data are well-known in the art, and are within the teachings of this invention.

The downstream utilization element 12 depicted in FIG. 2 may represent any of a number of types of elements or applications for using the processed image data generated by the image processing system 10 as described below. Illustrative downstream utilization elements include, for example, downstream applications such as the computer graphics systems, such as the computer graphics system described above in connection with FIG. 1, with which an operator can interactively edit an image represented by the processed image data. Other downstream utilization elements 12 may also include, for example, ink-jet or laser printing devices for rendering a hardcopy print of the image represented by the processed image data, systems for generating color separations for use in printing plants, or the like, or merely buffering or storage of the processed image data for future use.

As was stated earlier, the primary purpose of system 10 is to provide a means by which the visual appearance of device dependent image signals, such as RGB, can be made to match the original subject so that the original image as it is reproduced at each stage of the image chain, e.g., scanner, display, or output hardcopy, be substantially the same. The gamut and tone reproduction capabilities of each device in a typical image processing chain, such as those of system 2 of FIG. 1, are not typically dissimilar, requiring a color and tone mapping operation between all of them to assure consistency of visual appearance.

With reference now to FIG. 2, any imaging system can be represented as three functional subsystems:

DETECTION

The capture of light (quantum catch) depends upon the spectral sensitivity of the detectors. For simplicity we include any linear transformations of the detected signal in such a subsystem—i.e., the matrix transformation of the responses into X, Y, Z.

PROCESSING

Any inherently nonlinear transformation of the detected signal.

DISPLAY

The control of three image forming primaries to produce a visible image of the processed original scene on a given display device—i.e., the prescription to display the requested X', Y', Z'.

If the DETECTION system is constrained to three detectors with long, medium and short wavelength sensitivities (LMS or RGB), and further impose the condition that the PROCESSING subsystem introduce no "cross-channel" effects (inter-image) then the general system of the invention can be schematized as shown in FIG. 2.

For exact colorimetric reproduction the detector spectral sensitivities must be a linear combination of the tristimulus functions. Since the model of the invention is implemented as a construct, the CIE 1931 tristimulus functions were utilized—xbar, ybar, zbar, thus the quantum catch is linear in X, Y, Z.

To consider the transformations imposed by tone compression in the Ideal Film Model consideration was made of:

1. the underlying reasons for the dynamic range mismatch between the world and a displayed image and
2. a unified framework for describing the colors of objects in the world and in the displayed image.

Objects in complex scenes are, for the most part, reflecting surfaces with an intrinsic dynamic range of less than 60:1. What distinguishes the complex scene from a color matching booth are the multiplicity of illuminants and the variability of the angles of illumination falling on the surface (affecting incident flux) resulting in luminous intensity ratios up to 1000:1. The displayed image is viewed in a single illumination condition where the eye perceives a distribution of luminous intensity, regardless of the complexity of the illuminant. Because of the adaptation of the eye objects and images cannot simply be described by absolute luminous intensitiese—e.g. a midtone gray in the world may have the luminous intensity of a diffuse white in a displayed image. The simplest technique found to account for the adaptation was to normalize the luminous intensities (X, Y, Z) of an object by the luminous intensities (Xn, Yn, Zn) of a reference illuminant. [For a complex scene normalizing the luminous intensities of objects illuminated by a multiplicity of illuminants by a single reference illuminant is a transformation that maintains the relative luminous intensities at the expense of creating normalized luminous intensities (X/Xn . . . ) that may exceed unity.] The value of the reference illuminant was chosen to be such that an 18% gray card placed in the scene, or its image in the displayed reproduction, has a surface luminance of 18% of the reference illuminant.

Figure 3:
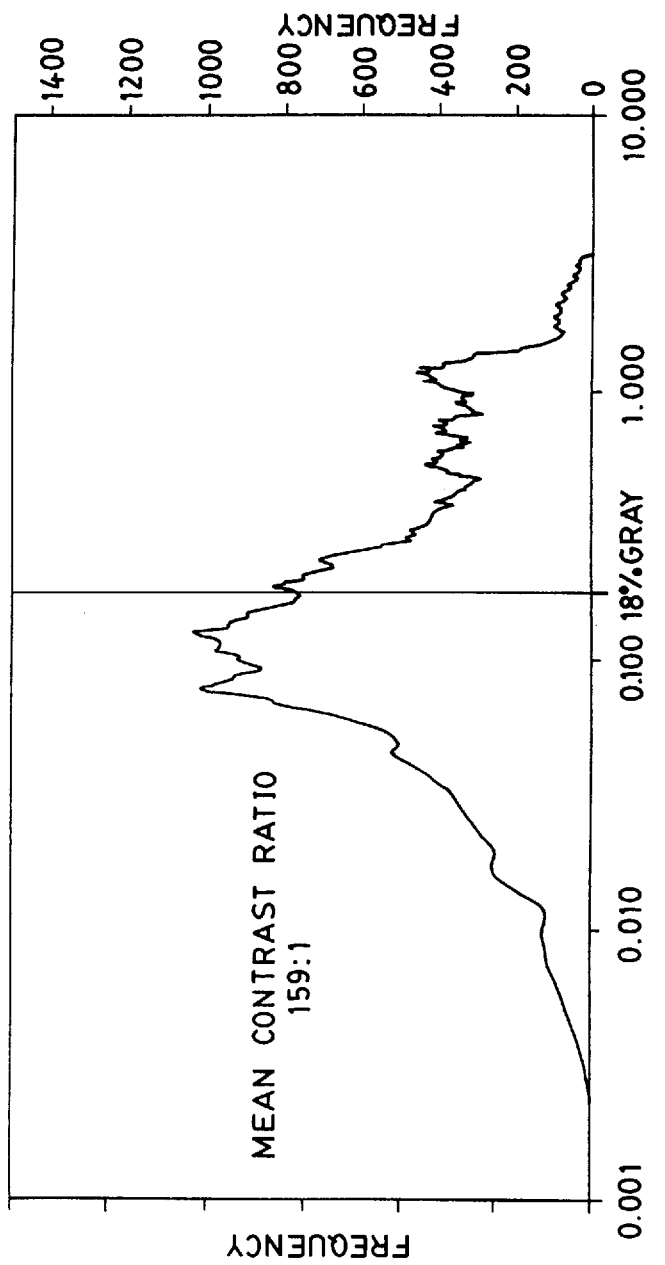
FIG. 3 is a graph of the frequency distribution of world luminance from a digital image library of anticipated world scenes.

Subject to this choice of reference illuminant 28 library images containing typical world scenes were surveyed and the resulting histogram of world "luminance" is shown in FIG. 3. The average brightness ratio (calculated by calculating the ratio of the brightest to darkest sample Y/Yn for each image and then finding the average) is 159:1 which is consistent with the data reported by L. A. Jones and H. R. Condit, Journal of the Optical Society of America, 38, 123 (1948), 39, 94 (1949). The dynamic range of possible world luminance values exceeds 1000:1. Since the display dynamic range of reflection prints and CRTs under ideal viewing conditions is less than 100:1, the need for a tone compression algorithm is clear should now be clear.

The tone compression is implemented by means of 3 1-D LUTS (look-up tables), 13, 14, and 15 for:

$$X/Xn \Rightarrow X'/Xn,$$

$$Y/Yn \Rightarrow Y'/Yn,$$

$$Z/Zn \Rightarrow Z'/Zn.$$

Figure 4:
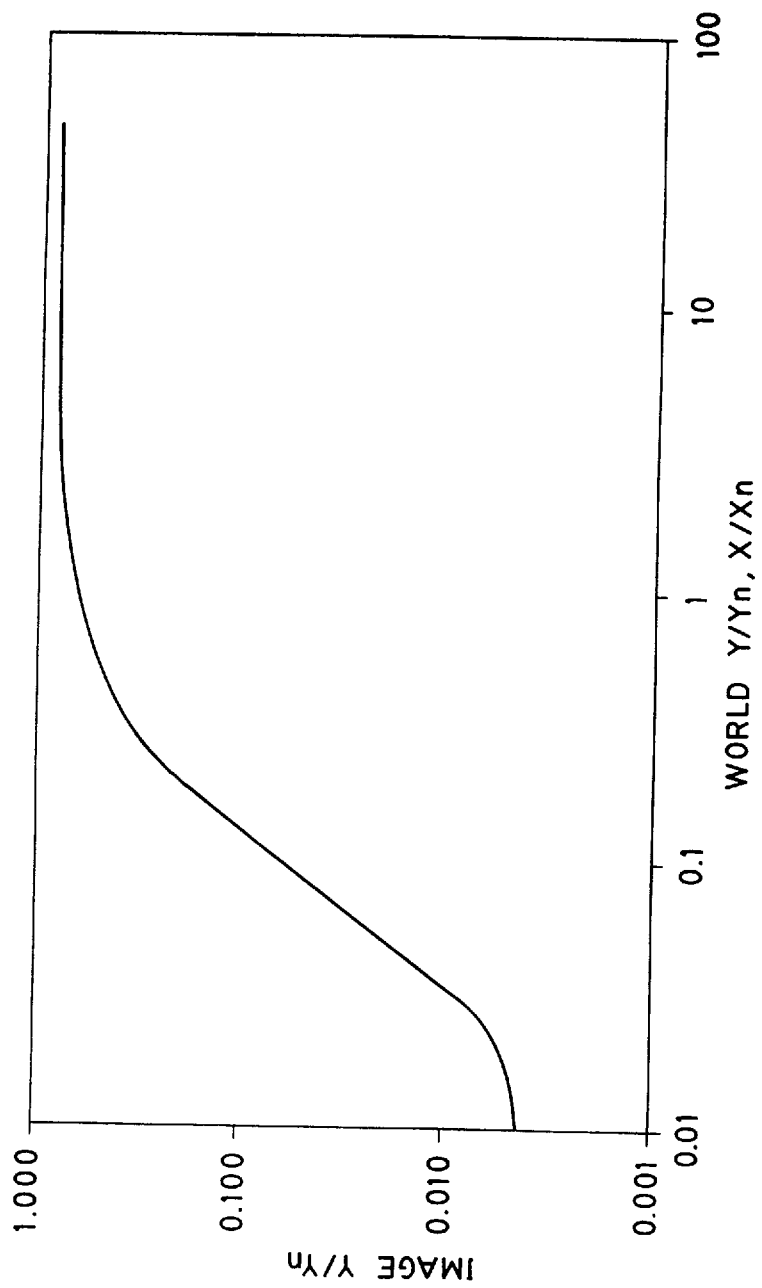
FIG. 4 is a graph of an Ideal Film tone compression curve of the invention.

LUTs 13, 14, and 15 are currently derived from the visual density neutral H&D curve for Vericolor III Type S (VPS) printed on EP2 paper, but it should be recognized that the choice of an optimal shape for the LUTs may be refined and may in fact be application dependent. Constraining the tone reproduction to reproduce 18% gray (world) as 18% gray (image), the LUT for $X/Xn \Rightarrow Y'/Xn$ is uniquely determined and is shown in FIG. 4. FIG. 4 is equivalent to a conventional H&D plot recognizing that the image density is $-\log(Y/Yn)$, thus the Y axis is the inverse of the conventional Density axis. Here, it is required that the neutral world objects be reproduced as neutral displayed images. This condition requires that the LUTs for $X/Xn \Rightarrow X'/Xn$ and for $Z/Zn \Rightarrow Z'/Zn$ be identical to the LUT for $Y/Yn \Rightarrow Y'/Yn$.

Tone compression is thus a prescription of modified luminous intensities (X', Y', Z') consistent with the dynamic range of the display device 12, assuming the display device 12 to perfectly reproduce the requested modified luminous intensities (X', Y', Z') from its display primaries—i.e. the display can be characterized as What You Request is What You Get (WYRIWYG).

Application/Front End Calibration

The Ideal Film construct has also been applied to the calibration of a digital image library and a CCD camera. The input calibration establishes a mapping between the imager response (a function of RGB digits) and the associated color description of the stimulus. Since the calibration must encompass the full dynamic range of typical world scenes, the Ideal Film model is used both to establish the color specification of colors under complex illuminants and to establish a well defined tone compression to realizable display dynamic ranges.

Figure 6A:
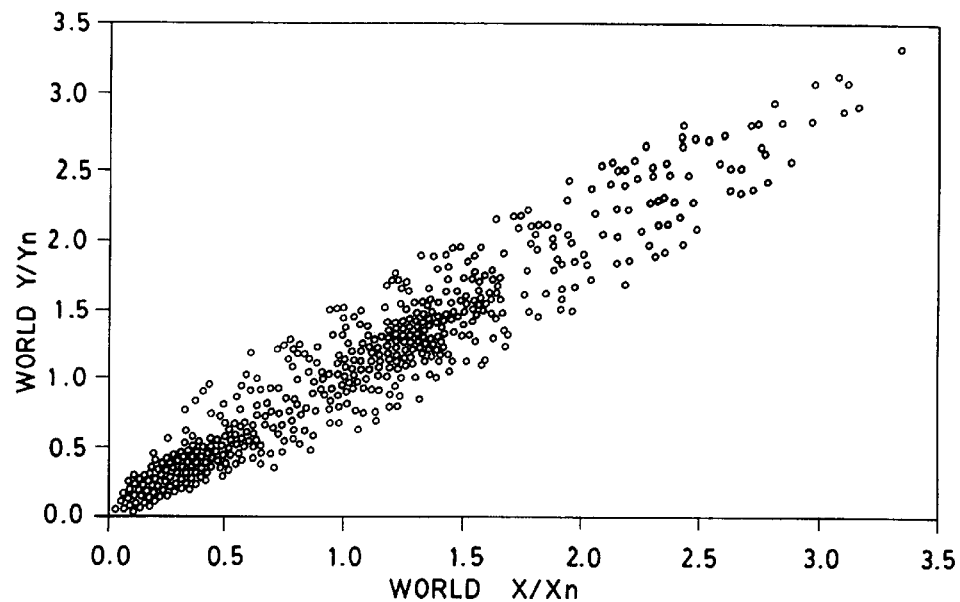
FIG. 6a are color space diagrams for world colors.
Figure 6A:
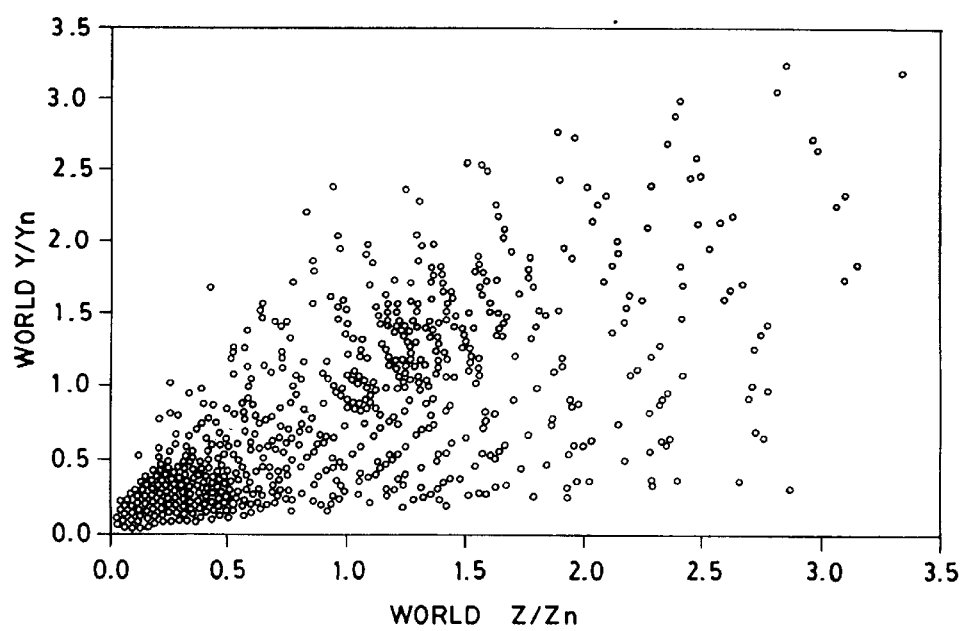
Figure 6B:
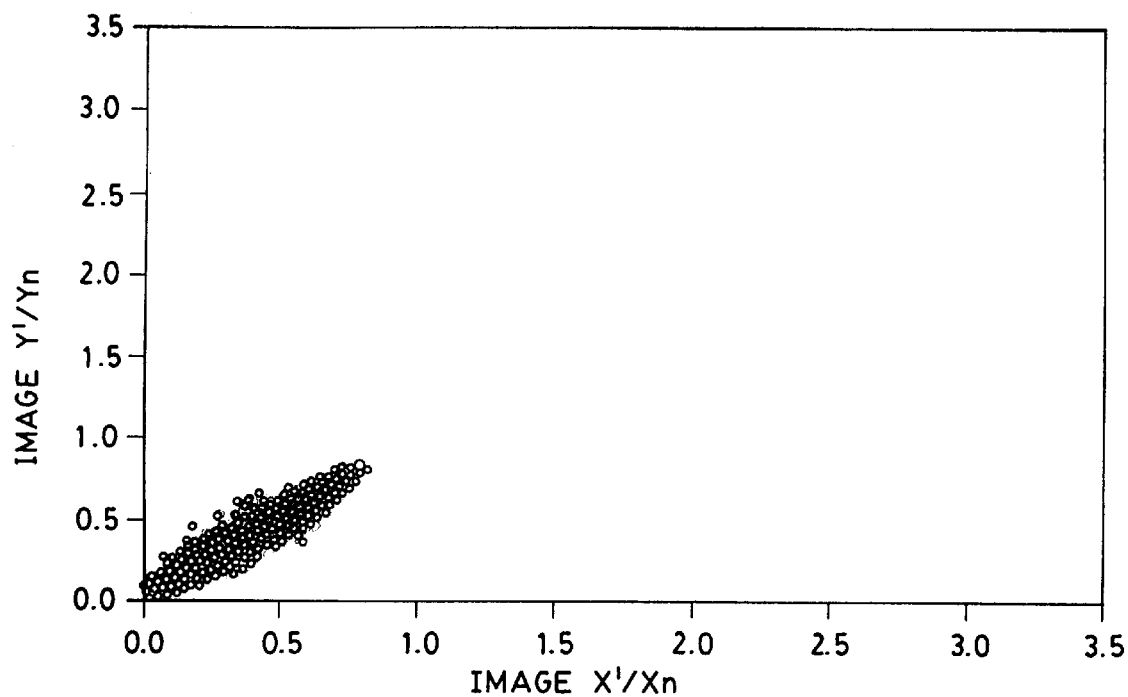
FIG. 6b are image color space diagrams showing how the world color space of FIG. 6a have been compressed via the invention.
Figure 6B:
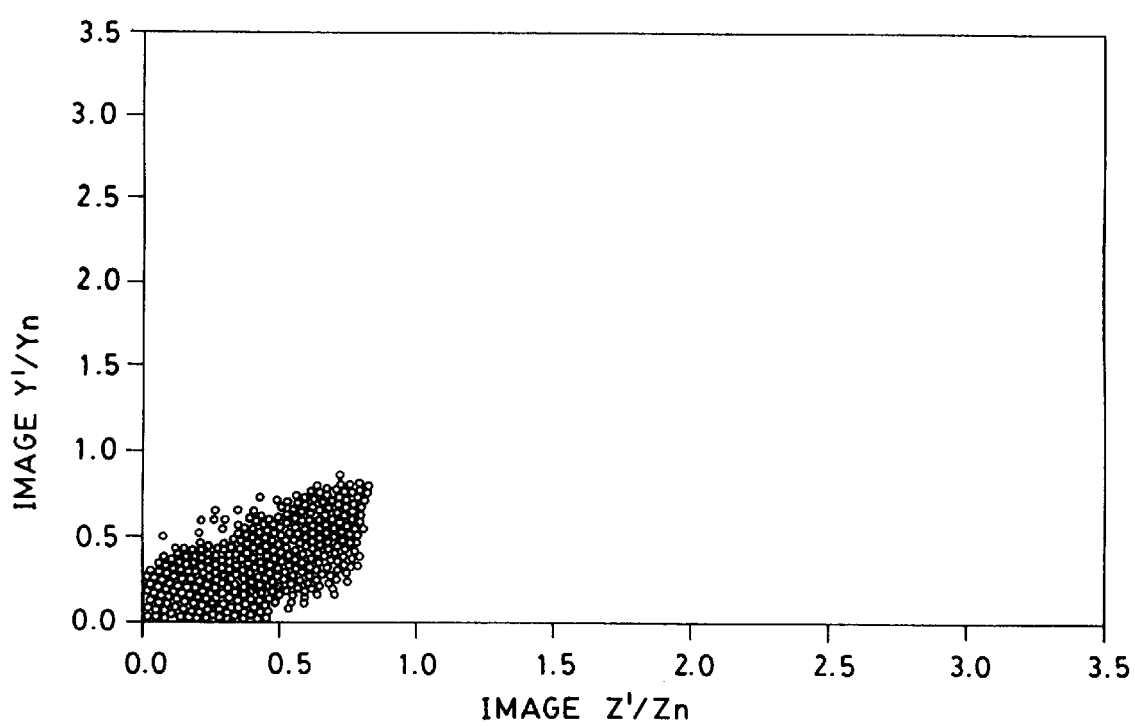

In this application, a set of reflection color targets, with known tristimulus values, are chosen to span color space. To simulate the dynamic range of typical scenes the measured tristimulus values of the target patches are scaled linearly by the relative exposures. The resulting set of tristimulus values given an objective description of the world color specification of the color targets as shown in FIG. 6a. Subsequently the world X/Xn, Y/Yn, Z/Zn can be transformed through the Ideal Film model to yield a set of desired color specification for an image of the targets consistent with the dynamic range of the display 12. The compressed X'/Xn, Y'/Yn, Z'/Zn are shown in FIG. 6b. The imager calibration is then constructed by associating the prescribed Ideal Film model tristimulus values X'/Xn, Y'/Yn, Z'/Zn with the imager response to the actual color calibration targets.

Application/Model Scene

One application of the Ideal Film mapping function is to establish goal reproduction criteria for real and simulated imaging systems. These criteria are established by how the Ideal Film reproduces a test target that is designed to be a model of complex world scenes. To that end before applying the Ideal Film model a target is constructed that is consistent with the known luminance and chromatic range of typical world scenes. A test target that has been found useful for this application of the invention has been constructed as a reflection test target from patches of Munsell paper chosen to uniformly sample color space. To simulate the luminance dynamic range, such targets are imaged under a wide range of levels of illuminance (plus/minus 3 stops from nominal). The reference illuminant is chosen to be the illumination for the "Nominal" image. The "normalized luminances" of the over and under exposed patches are scaled by the level of illumination for each image (either physically in the case of an actual exposure, or through calculation). Since the Nominal X/Xn, Y/Yn, Z/Zn are known, the corresponding values for the over and under illumination cases can be determined in a straight forward manner.

Figure 5:
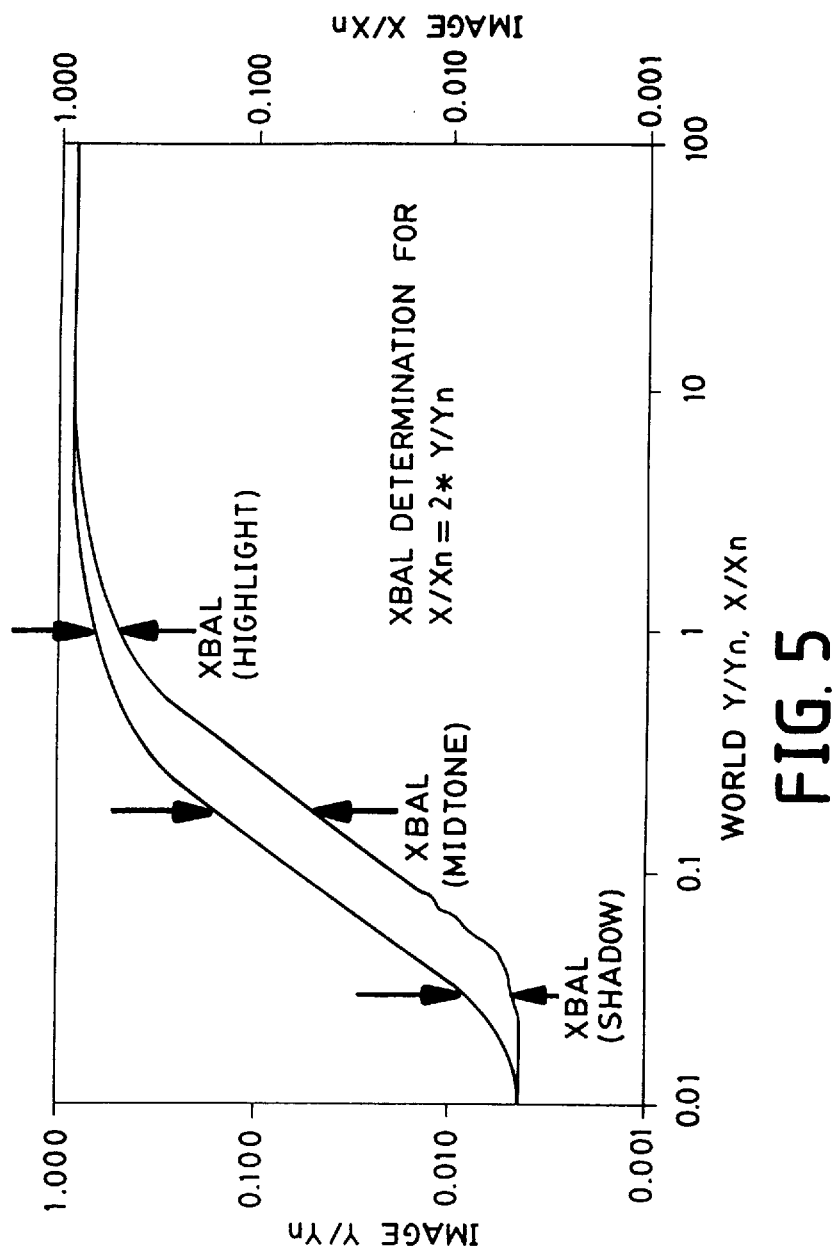
FIG. 5 is a graph of chromatic reproduction as a function of lightness for an Ideal Film tone compression curve of the invention.

Considering a color patch for which:

$$X/Xn = 2*Y/Yn$$

the effects of the VPS tone compression at various levels of illumination by reference to the pastel H&D curves can be calculated and are shown in FIG. 5. Since X/Xn and Y/Yn differ by a factor of 2 for all levels of illumination, the resulting difference in luminous intensities is found to be:

$$\text{"Xbal"} = \log(X'/Xn) - \log(Y'/Yn)$$

at all exposure by displacing the two curves by 0.3 Log E units. Since color saturation is proportional (nonlinear) to the "Xbal" it can be seen that the film like tone compression of the invention has the consequence of desaturating colors at both high and low levels of illumination, while for mid levels of illumination there is an enhancement of the response compared to the world (the mid range slope of the VPS tone reproduction curve is greater than unity).

"Real Film Models"

Figure 7A:
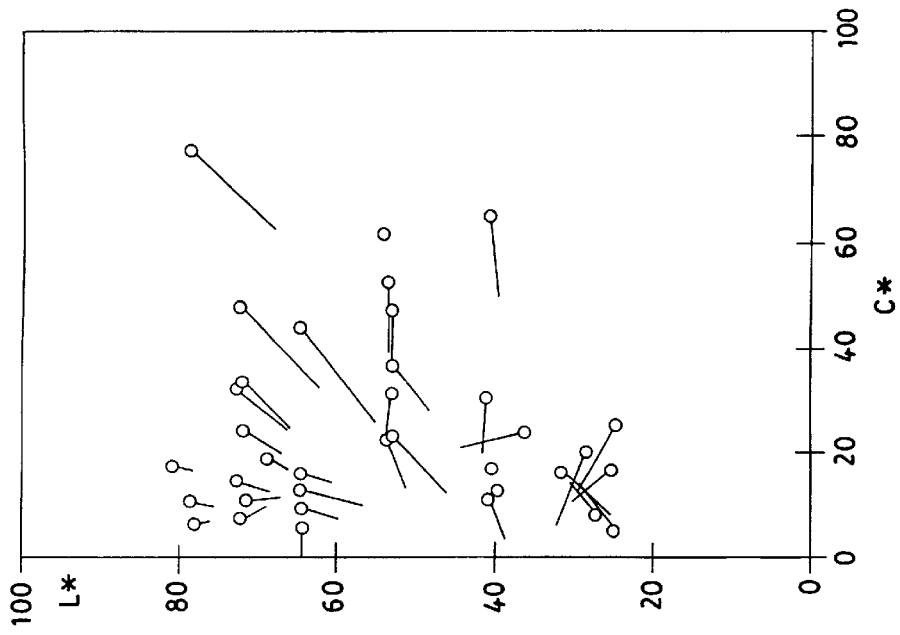
FIG. 7a are graphs showing the color reproduction of VPS (vericolor III Type S) referenced to Ideal Film of the invention.
Figure 7A:
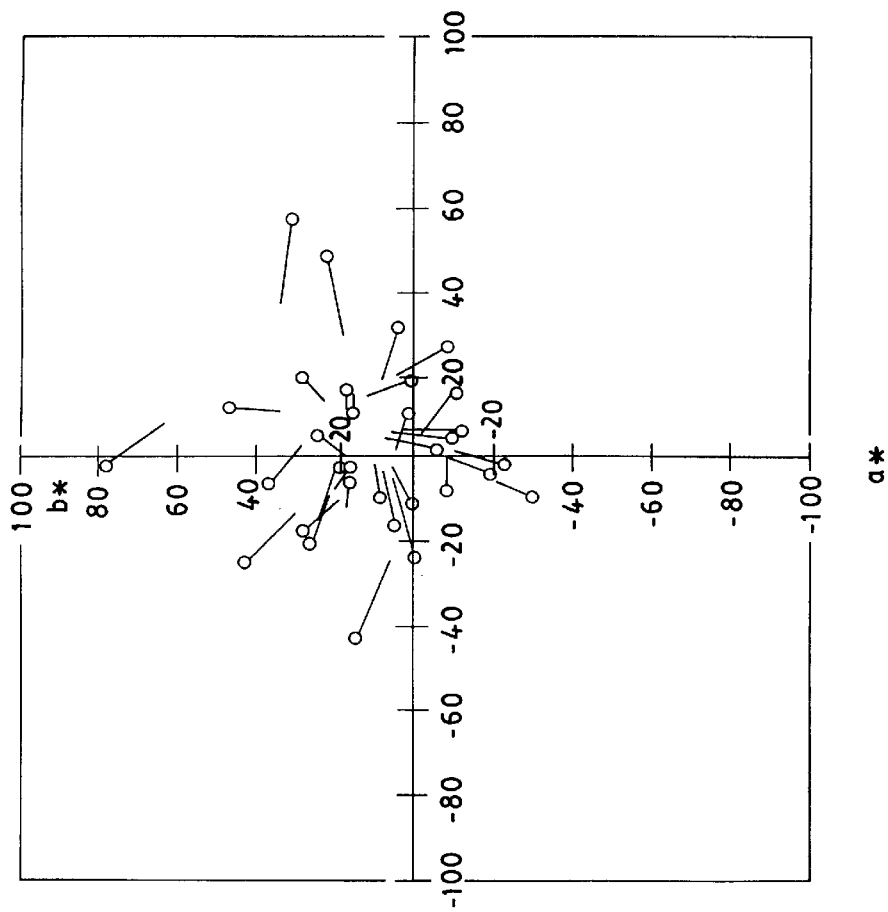
Figure 7B:
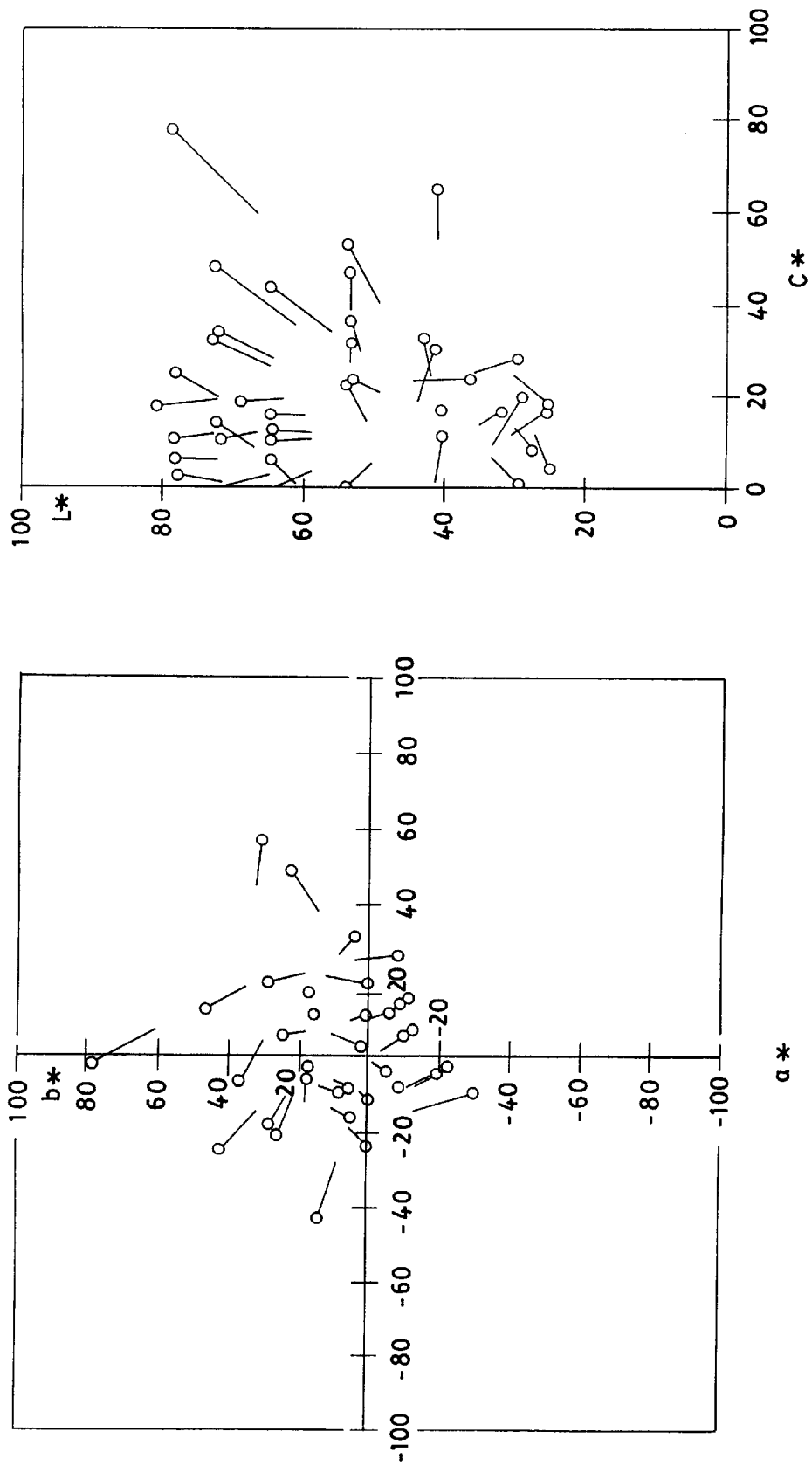
FIG. 7b are graphs showing the color reproduction of another well-known film referenced to Ideal Film.
Figure 7C:
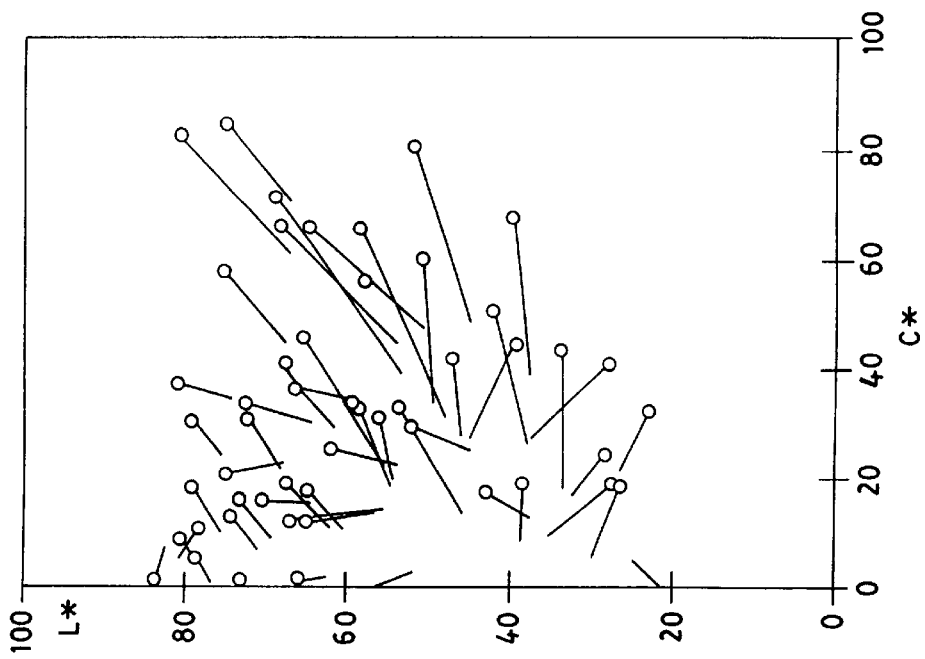
FIG. 7c are graphs showing the color reproduction of Polaroid Spectra® film referenced to the Ideal Film.
Figure 7C:
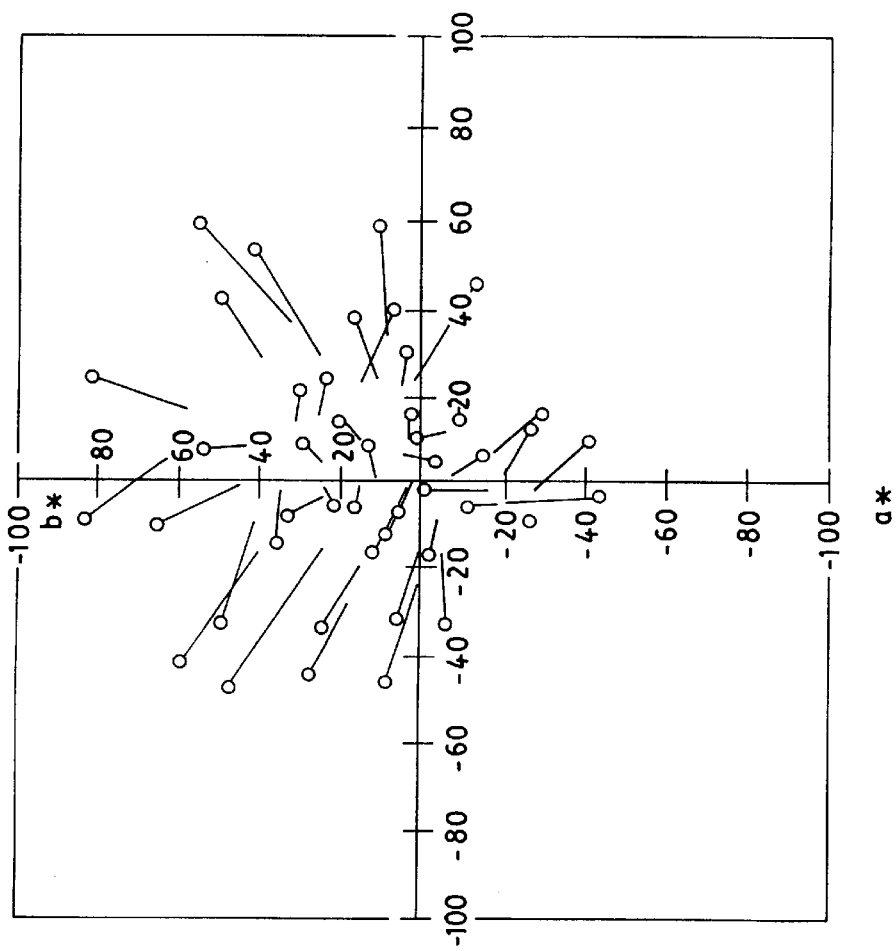

The Ideal Film Model also presents a useful reference system with which to compare the performance of real imaging systems. The calorimetric reproduction of a series of color targets imaged at various exposures can be compared with the computed Ideal Film reproduction of the same target images. In FIGS. 7a–c the colorimetric difference vectors (delta E*) from the Ideal Film reproduction of the color patch (open square symbol) are shown for nominal exposures of various well-known films. For VPS in which the tone compression matches the Ideal Film (note the L* reproduction of the neutral patches), the chromatic reproduction of the real film differs from the ideal, as might be expected, since neither the spectral sensitivity nor the inter-image effects in the real film are modeled by the Ideal Film. While these differences exist, it must be emphasized that the overall performance of the Ideal Film as compared with the real films is fundamentally "film like".

A Preferred Implementation

As described in above, the Ideal Film Model was implemented by effecting tone compression on the X/Xn, Y/Yn, and Z/Zn channels of an imaging system whose spectral sensitivities were considered to be a linear combination of the color matching functions. Thus, $$[Y/Yn]' = f(\log[Y/Yn]) \quad\quad\quad 1.$$

$$[X/Xn]' = g(\log[X/Xn]) \quad\quad\quad 2.$$

$$[Z/Zn]' = h(\log[Z/Zn]) \quad\quad\quad 3.$$

Maintenance of neutrals requires that $f(x)=g(x)=h(x)$. Color saturation manifests as log Exposure differences: $[\log X/Xn - \log Y/Yn]$ and $[\log Z/Zn - \log Y/Yn]$ can be scaled by a so called "pastel desaturation" multiplier: P.

$$\log[Y_p/Yn] = \log[Y/Yn]$$

$$\log[X_p/Xn] - \log[Y/Yn] = P^*\{\log[X/Xn] - \log[Y/Yn]\}$$

$$\log[Z_p/Zn] - \log[Y/Yn] = P^*\{\log[Z/Zn] - \log[Y/Yn]\}$$

(i.e., the output color differences are P times the input differences). Thus equations 1–3 become:

$$[Y/Yn]' = f(\log[Y_p/Yn] \quad\quad\quad 1a.$$

$$[X/Xn]' = f(\log[X_p/X_n]) = f(P^*\log[X/Xn] - [P-1]^*\log[Y/Yn]) \quad 2a.$$

$$[Z/Zn]' = f(\log[Z_p/Zn]) = f(P^*\log[Z/Zn] - [P-1]^*\log[Y/Yn]) \quad 3a.$$

The function $f(x)$ can be implemented as either a 1-D LUT as described above or alternatively as an analytical function.

In the initial implementations of the Ideal Film Model mapping function, the tone scale was taken to be the green sensitometric curve of VPS printed onto Ektacolor2 print paper, using a simple density to reflectance transform.

More recent implementations have used analytical expressions based upon hyperbolic functions: TANH(log(x)):

$$[Y/Yn]' = f(\log[Y/Yn]) = A0 + A1^* \text{TAN } H[S^*(\log(Y/Yn) + C)]. \quad 4.$$

The coefficients A0, A1 and S are treated as independent variables determining the Dmax and Dmin (A0,A1) and slope (S). The coefficient C is used to ensure that an 18% reflectance is reproduced as an 18% reflectance. The functions for $[X/X_n]'$ and $[Z/Z_n]'$ are evaluated using equations 2a and 3a and the function $f(x)$ in equation 4.

A series of psychovisual experiments exploring the impact of slope and the Ideal Film models implemented via computer studies were based on tone compression LUTs derived from this TANH expression. In this form, the print reflectance tone scale in the shoulder and toe regions cannot be independently manipulated.

Fitting eq. 4 to sensitometric data used in the initial LUT gave the functional form:

$$[Y/Yn]' = 0.404 + 0.4^*\text{TAN } H[2.37(\log(Y/Yn) + 0.477))P=0.8 \quad 4a.$$

Subsequent psychovisual testing suggested that a lower slope and a higher value of the pastel desaturation would not degrade quality and would extend the dynamic range; thus, the current preferred function is given below and shown graphically in FIG. 8:

$$[Y/Yn]' = 0.404 + 0.4^*\text{TAN}H[1.8(\log(Y/Yn) + 0.393))P=1.0 \quad 4b.$$

In general the constants A0, A1, S and C can be determined from the sensitometric parameters can be as follows (see FIG. 8):

$$A0 = [10^{-Dmin} + 10^{-Dmax}]/2$$

$$A1 = [10^{-Dmin} - 10^{-Dmax}]/2$$

S is determined from the average slope $[\Gamma = \Delta D / \Delta(\log(Y/Yn)]$ between two points D1, D2:

$$S = \Gamma^*\{A \text{ TAN } H([(10^{-D1}) - A0]/A1) - A \text{ TAN } H([(10^{-D2}) - A0]/A1)\} / [D2-D1]$$

$$C = [1/S]^*A \text{ TAN } H([(0.18) - A0]/A1) - \log 0.18$$

A typical sensitometric slope is measured between two densities:

$$D1 = D\text{max} - [D\text{max} - D\text{min}]/4 \text{ and } D2 = D\text{min} + [D\text{max} - D\text{min}]/4$$

This slope is referred to as the ¼–¾ slope—($\Gamma_{¼-¾}$). In terms of $\Gamma_{¼-¾}$ for $D_{max}=2.4$ and $D_{min}=0.1$, the above recipes yield:

$$A1 = 0.404$$

$A2=0.4$ $S=1.39*\Gamma_{1/4-3/4}$

The construct of an Ideal Film Model characterized by exact colorimetric detection of world color information, a non linear tone compression acting on the tristimulus values X/Xn, Y/Yn, Z/Zn, and an exact colorimetric display of the compressed tristimulus values has been shown to:

1. provide a process for describing the necessary tone reproduction required in displaying optimal reproductions of complex world pictorial scenes;
2. provide a reference system for evaluating the color and tone reproduction of real imaging systems;
3. provide a well defined calibration protocol for the calibration of electronic and hybrid imaging systems designed to capture complex world scenes;
4. and provide a useful model for simulating some sensitometric attributes of real photographic systems.

The foregoing description has been limited to a specific embodiment of this invention. It will be apparent, however, that variations and modifications may be made to the invention, with the attainment of some or all of the advantages of the invention. It is the object of the appended claims to cover these and such other variations and modifications as come within the true spirit and scope of the invention.

What is claimed is:

1. A color management system comprising:
   a plurality of system components each one of which has the ability to reproduce a predetermined gamut of colors;
   means for acquiring an electronic color signal in the form of a plurality of color channels which represent an original scene in device dependent color space;
   means for receiving said electronic color signal and mapping it into a plurality of device independent color space signals; and
   means for transforming at least one of said device independent color signals into a smaller color gamut that matches the dynamic range of the gamut of a predetermined one of said system components, said transforming means compressing the color gamut of said device independent color signal with a function comprising a hyperbolic tangent so that said original scene, when reproduced by said predetermined component, has a film-like appearance.

2. The system of claim 1 wherein said device independent color space signals are encoded as CIE tristimulus values.

3. The system of claim 1 wherein said system components are selected from the group consisting of electronic display devices and digital printers.

4. The system of claim 1 wherein said means for acquiring an electronic color signal is selected from the group consisting of scanners, electronic cameras, and intermediate storage device.

5. A color management method for use with a plurality of system components each one of which has the ability to reproduce a predetermined gamut of colors, said method comprising the steps of:
   acquiring an electronic color signal in the form of a plurality of color channels which represent an original scene in device dependent color space;
   receiving said electronic color signal and mapping it into a plurality of device independent color space signals; and
   transforming at least one of said device independent color signals into a smaller color gamut that matches the dynamic range of the gamut of a predetermined one of said system components by compressing the color gamut of said device independent color signal with a function comprising a hyperbolic tangent so that said original scene, when reproduced by said predetermined component, has a film-like appearance.

6. The method of claim 5 wherein said device independent color space signals are encoded as CIE tristimulus values.

7. The method of claim 5 wherein said steps of transforming is applied to components selected from the group consisting of electronic display devices and digital printers.

8. The method of claim 5 wherein said electronic color signal is acquired from the group consisting of scanners, electronic cameras, and intermediate storage device.

9. A color management system comprising:
   a plurality of system components each one of which has the ability to reproduce a predetermined gamut of colors;
   means for acquiring an electronic color signal in the form of a plurality of color channels which represent an original scene in device dependent color space;
   means for receiving said electronic color signal and mapping it into a plurality of device independent color space signals; and
   electronic means for transforming at least one of said device independent color signals into a smaller color gamut that matches the dynamic range of the gamut of a predetermined one of said system components, said electronic transforming means characterized by providing film-like tone compression using a function comprising a hyperbolic tangent while maintaining exact colorimetric reproduction so that said original scene, when reproduced by said predetermined component, has a film-like appearance.

10. A color management method comprising the steps of:
    reproducing a predetermined gamut of colors;
    acquiring an electronic color signal which represents an original scene in device dependent color space;
    mapping said electronic color signal into a plurality of device independent color space signals; and
    electronically transforming said device independent color signal into a predetermined smaller color gamut, said transformation characterized by film-like tone compression using a function comprising a hyperbolic tangent while maintaining exact colorimetric reproduction so that said original scene, when reproduced, has a film-like appearance.

11. A color management system comprising:
    a plurality of system components, said system components able to reproduce a predetermined gamut of colors;
    means for acquiring an electronic color signal in the form of a plurality of color channels which represent an original scene in device dependent color space;
    means for receiving said electronic color signal and mapping said electronic color signal into a plurality of device independent color space signals; and
    means for transforming at least one of said device independent color space signals into a smaller color gamut that matches the dynamic range of the gamut of a predetermined one of said system components, said transforming means comprising means for compressing the color gamut of said device independent color space signal with a function comprising a hyperbolic tangent, said function expressed as:

$$\{Y/Yn\}' = f(\log \{Y/Yn\}) = A0 + A1 * \text{TAN}H\{S^* (\log (Y/Yn) + C)\},$$

where coefficients A0, A1, and S are independent variables determining the $D_{max}$ and $D_{min}$ (A0, A1) and slope (S) and coefficient C is used to ensure that an 18% reflectance is reproduced as an 18% reflectance such that said original scene, when reproduced by said predetermined component, has a film-like appearance.

12. A color management method for use with a plurality of system components for reproducing a predetermined gamut of colors, comprising the steps of;

acquiring an electronic color signal in representing a plurality of color channels representing an original scene in device dependent color space:

receiving said electronic color signal and mapping said electronic signal into a plurality of device independent color space signals; and transforming at least one of said device independent color space signals into a smaller color gamut that matches the dynamic range of the gamut of a predetermined one of said system components, said transforming step comprising the step of compressing the color gamut of said device independent color signal with a function comprising a hyperbolic tangent, said function expressed as:

$$\{Y/Yn\}' = f(\log \{Y/Yn\}) = A0 + A1 * \text{TAN } H\{S^*(\log (Y/Yn) + C)\},$$

where coefficients A0, A1, and S are independent variables determining the $D_{max}$ and $D_{min}$ (A0, A1) and slope (S) and coefficient C is used to ensure that an 18% reflectance is reproduced as an 18% reflectance such that said original scene, when reproduced by said predetermined component. has a film-like appearance.

13. A color management system comprising:

a plurality of system components to reproduce a predetermined gamut of colors;

means for acquiring an electronic color signal comprising a plurality of color channels to represent an original scene in device dependent color space;

means for receiving said electronic color signal and for mapping said electronic color signal into a plurality of device independent color space signals; and means for transforming at least one of said device independent color signals into a smaller color gamut that matches the dynamic range of the gamut of a predetermined one of said system components, said transforming means comprising means for compressing the color gamut of said one of the plurality of said system components such that said original scene under complex illumination, when reproduced by said predetermined system component, has a film-like appearance and distinguishable color signals.

14. A color management method comprising the steps of:

acquiring a plurality of color channel signals which represent an original scene in device dependent color space;

mapping each one of the plurality of color channel signals into a plurality of device independent color space signals; and transforming a portion of the plurality of device independent color space signals into a smaller color gamut that matches the dynamic range of the gamut of one of a plurality of system components, said transform step comprising the step of compressing the color gamut of said one of the plurality of said system components such that said original scene under complex illumination, when reproduced by said system component, has a film-like appearance and distinguishable color signals.

* * * * *